US008131968B2

(12) United States Patent
Ishioka

(10) Patent No.: US 8,131,968 B2
(45) Date of Patent: Mar. 6, 2012

(54) INFORMATION PROCESSING DEVICE

(75) Inventor: Toshiyuki Ishioka, Kanagawa (JP)

(73) Assignee: Panasonic Corporation, Osaka (JP)

( * ) Notice: Subject to any disclaimer, the term of this patent is extended or adjusted under 35 U.S.C. 154(b) by 143 days.

(21) Appl. No.: 12/746,657

(22) PCT Filed: Dec. 25, 2008

(86) PCT No.: PCT/JP2008/003980
§ 371 (c)(1), (2), (4) Date: Jun. 7, 2010

(87) PCT Pub. No.: WO2009/084210
PCT Pub. Date: Jul. 9, 2009

(65) Prior Publication Data

US 2010/0262800 A1 Oct. 14, 2010

(30) Foreign Application Priority Data

Dec. 28, 2007 (JP) ................................ 2007-339876

(51) Int. Cl.
*G06F 12/00* (2006.01)

(52) U.S. Cl. ....................................................... 711/167

(58) Field of Classification Search ........................ None
See application file for complete search history.

(56) References Cited

U.S. PATENT DOCUMENTS

| | | | | |
|---|---|---|---|---|
| 5,179,642 | A | 1/1993 | Komatsu | |
| 7,213,095 | B2 * | 5/2007 | Middleton et al. | 710/310 |
| 7,660,933 | B2 * | 2/2010 | Wang | 710/310 |
| 2005/0273543 | A1 * | 12/2005 | Middleton et al. | 710/310 |
| 2006/0001629 | A1 | 1/2006 | Obinata | |
| 2009/0013204 | A1 | 1/2009 | Kobayashi et al. | |
| 2009/0094474 | A1 | 4/2009 | Kaneko et al. | |

FOREIGN PATENT DOCUMENTS

| | | |
|---|---|---|
| JP | 62-289999 | 12/1987 |
| JP | 64-47133 | 2/1989 |
| JP | 01-126687 | 5/1989 |
| JP | 01-156816 | 6/1989 |
| JP | 01-224851 | 9/1989 |
| JP | 03-191445 | 8/1991 |
| JP | 05-266177 | 10/1993 |
| JP | 6-131882 | 5/1994 |
| JP | 2006-18002 | 1/2006 |

OTHER PUBLICATIONS

Japan Office Action, dated on Oct. 4, 2011.

* cited by examiner

*Primary Examiner* — Hiep Nguyen
(74) *Attorney, Agent, or Firm* — Greenblum & Bernstein, P.L.C.

(57) ABSTRACT

An information processing device in which memory bands can be significantly cut. In the present device, an access determining/managing portion (105) determines whether or not write data meets access determination conditions when write-accessing a memory (104), and manages this determination result and access location data (an address in the memory (104)) during the write access as access determination results (107), and does not perform a write access if the write data does not meet the access determination conditions. On the other hand, the access determining/managing portion (105) references the access determination results (the access location data and determination result) when read-accessing the address, and if the access determination results meet the access determination conditions when read-accessing the address, the data determined by the access determining conditions is returned to the master, without read-accessing the memory (104).

13 Claims, 7 Drawing Sheets

INFORMATION PROCESSING DEVICE

TECHNICAL FIELD

The present invention relates to an information processing apparatus having a memory.

BACKGROUND ART

Recently, LSIs (Large Scale Integration circuits) for processing digital images have a significant problem of insufficient memory bandwidth (the number of accesses per unit time) resulting from an increase in the size of images to be processed.

Now, this problem will be explained with reference to FIG. 1, using "color key transparency", which is one image blending method, as an example. "Color key transparency" is the image blending method to blend two images by removing only a specific color referred to as "color key" from an original image and fitting another image in the original image. It is possible to set any colors as a color key.

FIG. 1 shows a case in which image C is created by blending image A and image B stored in a memory. Color key data is set in image A. Processor (CPU: Central Processing Unit) 1 creates image A, that is, sets color key data for image A. Image A with set color key data is written to memory 4 through memory controller 3. When blending image A and image B, image processing section 2 accesses memory 4 through memory controller 3 and reads image A and image B from memory 4. Then, image processing section 2 allows image B to appear to draw image B when color key data of image A is read, but does not allow to image B to appear to draw image A when color key data image A is not read. By this means, it is possible to obtain composite image C.

As described above, with conventional color key transparency, even color key data is read from memory 4. However, color key data serves no purpose as data, so that the memory bandwidth for this color key data is desired to be reduced from the perspective of reduction in wasteful memory accesses and consequently a speed-up in memory accesses.

Conventionally, there are technologies described, for example, in patent document 1 and patent document 2, as a technology to reduce memory bandwidth (the number of accesses per unit time).

The technology described in patent document 1 aims to reduce the number of memory accesses by preventing write processing in the process of drawing in an image memory, including reading/modifying/writing, if the result after modifying is the same as read data.

Meanwhile, the technology of patent document 2 aims to reduce the number of memory accesses for unnecessary write processing in a facsimile and so forth that compresses continuing identical image data by run-length coding: by preventing generation of processing other than write processing to the first address in continuing image data when identical image data continue while clearing the display memory using a predetermined value in advance; and returning previous image data when it is possible to read the clear value.

Patent Document 1: Japanese Patent Application Laid-Open No. 5-266177

Patent Document 2: Japanese Patent Application Laid-Open No. 1-126687

DISCLOSURE OF INVENTION

Problems to be Solved by the Invention

However, with both above-described technologies of patent document 1 and patent document 2, it is not possible to reduce the number of read accesses although it is possible to reduce the number of unnecessary write accesses. That is, the technology described in patent document 1 omits write processing when read data and modification data match during reading/modifying/writing, and does not consider reducing the number of memory accesses in read processing. Moreover, with the technology described in patent document 2, although it is possible to reduce the number of write accesses, the effect of reducing memory bandwidth is limited because previous image data is returned when it is possible to read the clear value, that is, data is read and then replaced by judging whether or not read data is clear data.

It is therefore an object of the present invention to provide an information processing apparatus that allows a significant reduction in memory bandwidth.

Means for Solving the Problem

The information processing apparatus according to the present invention adopts a configuration including: a storing section that stores data; a first processing section that requests write access to the storing section; a second processing section that requests read access to the storing section; and an access control section that controls the write access from the first processing section to the storing section and the read access from the second processing section to the storing section individually. At a time of the read access from the second processing section to the storing section, the access control section refers to a judgment result obtained by judging whether or not write data satisfies a predetermined condition at a time of the write access from the first processing section to the storing section and access position information at the time of the write access, and, when the judgment result corresponding to an access position at the time of the read access indicates that the write data satisfies the predetermined condition at the time of the write access, returns predetermined data that is determined from the predetermined condition, to the second processing section, without reading data from the storing section.

Advantageous Effects of Invention

According to the present invention, it is possible to significantly reduce memory bandwidth.

BEST MODE FOR CARRYING OUT THE INVENTION

Now, embodiments of the present invention will be described in detail with reference to the accompanying drawings.

Embodiment 1

Figure 2:
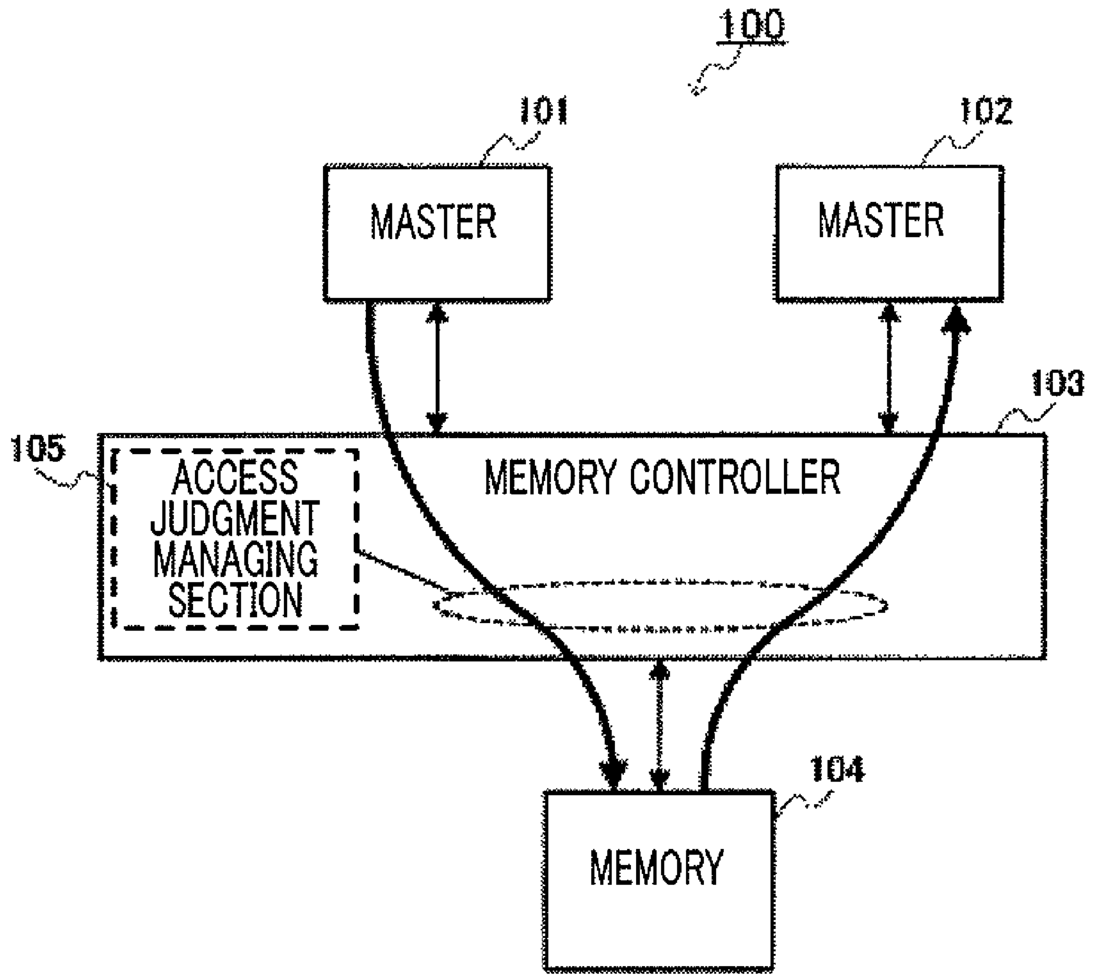
FIG. 2 is a block diagram showing a configuration of an information processing apparatus according to embodiment 1 of the present invention.

FIG. 2 is a block diagram showing a configuration of an information processing apparatus according to embodiment 1 of the present invention.

Information processing apparatus 100 in FIG. 2 has a plurality of (e.g. two) masters 101 and 102, memory controller 103 and memory 104.

Figure 1:
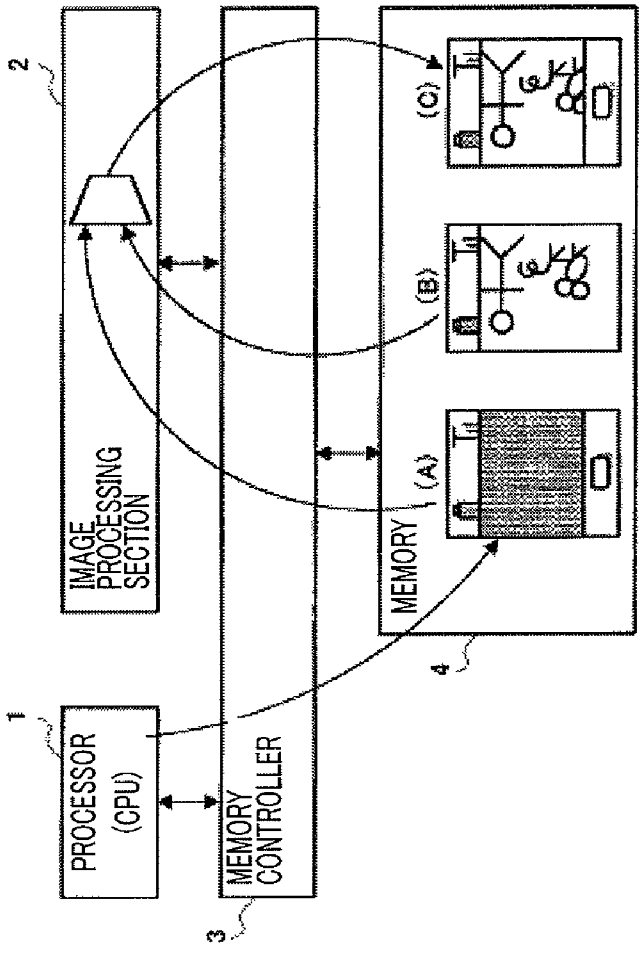
FIG. 1 is a schematic diagram explaining a conventional technology.

Each of masters 101 and 102 is configured by, for example, a processor (CPU) that performs data processing. Here, a case is shown as an example where master 101 as a first processing section creates write data to be written to memory 104 (request for write access) and master 102 as a second processing section reads data (read data) stored in memory 104 (request for read access). For example, master 1 corresponds to the image processing section in FIG. 1 showing an exemplary color key transparency. Here, although a case is illustrated where master 101 requests write access and master 102 requests read access, the present embodiment is not limited to this, naturally. Both master 101 and 102 can individually request write access and read access.

Memory controller 103, as an access control section, has a function to control access from a plurality of masters 101 and 102 to memory 104. With the present embodiment, in particular, memory controller 103 has an access judgment managing function. To be specific, memory controller 103 has access judgment managing section 105 that judges access conditions and manages access from each master.

To be more specific, access judgment managing section 105 judges whether or not write data satisfies a predetermined condition (or "access judgment condition") when write access is performed from any one of a plurality of masters 101 and 102 (or one specific master) to memory 104. Then, access judgment managing section 105 manages this judgment result and access position information in this write access (hereinafter judgment results and access position information are collectively referred to as "access judgment result"). In addition, when write data satisfies the above-described access judgment condition, access judgment managing section 105 does not write data to memory 104.

In addition, access judgment managing section 105 refers to access judgment results (the above-described access position information and judgment results), which are managed by access judgment managing section 105 when one of a plurality of masters 101 and 102 (or a master other than the above-described specific master) performs read access to memory 104. Then, when the judgment result corresponding to the access position in read access satisfies the above-described access judgment condition in write access, access judgment managing section 105 does not read data from memory 104 and returns predetermined data determined based on the above-described access judgment condition to the maser having requested read access. Meanwhile, when the judgment result corresponding to the access position in read access does not satisfy the above-described access judgment condition in write access, access judgment managing section 105 reads data from memory 104 and returns the read data from memory 104 to the master having requested read access.

Here, "access judgment condition" is, for example, whether or not given data matches a set value as set data (for example, color key data in a case of color key transparency) set in advance by one of a plurality of masters (or one specific master). Set values as set data are held in memory controller 103. In addition, "access position information" is, for example, an address on memory 104.

Memory 104 widely includes memories which are able to store, read and write data and commands. For example, memory 104 is configured by a RAM (Random Access Memory) or a flash memory. Naturally, the type of memory 104 is not limited to this. In addition, as a method of using memory 104, a system in which a plurality of masters deliver data through a specific field on memory 104 may be possible. Moreover, when a system processes image data, memory 104 can include a frame buffer. That is, a system in which a plurality of masters deliver image data through a frame buffer on memory 104 may be possible. Here, when memory 104 includes a frame buffer, "access position information" may be, for example, coordinates on a frame buffer instead of memory addresses.

Figure 3:
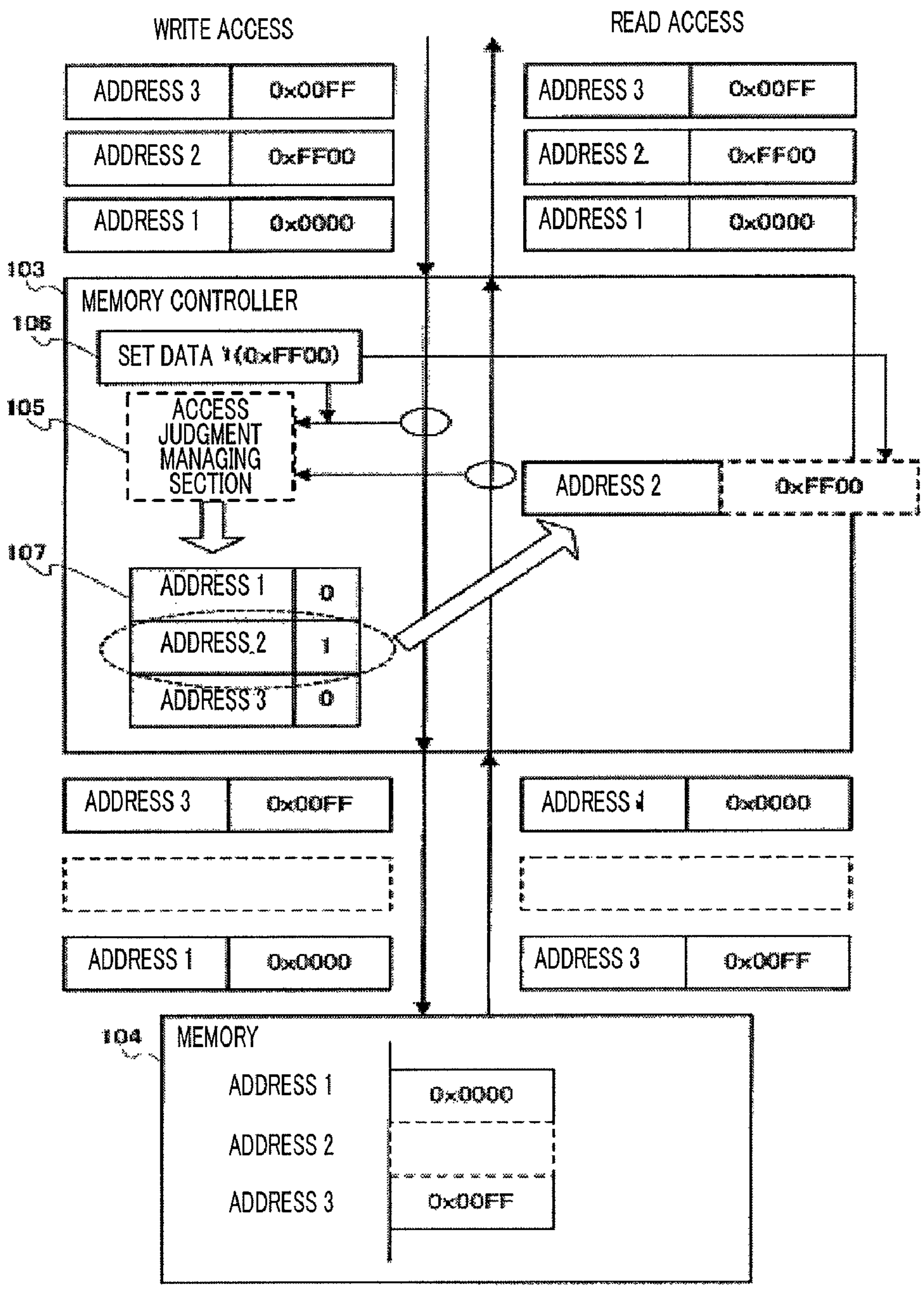
FIG. 3 is a schematic diagram showing an exemplary access judgment managing function according to embodiment 1.

Next, operations of information processing apparatus 100 having the above-described configuration will be described. FIG. 3 is a schematic diagram showing an exemplary access judgment managing function according to the present embodiment.

With the example shown in FIG. 3, an access judgment condition is whether or not write data matches set data (e.g. "0xFF00") set by one of a plurality of masters 101 and 102.

First, when there is write access as shown in FIG. 3 from a certain master to address 1, address 2 and address 3, access judgment managing section 105 in memory controller 103 judges that write data to address 1 and address 3 do not match set data 106 (represented by "0" in FIG. 3) and write data to address 2 matches set data 106 (represented by "1" in FIG. 3). Then, access judgment managing section 105 manages this access judgment result 107 and does not write the write data matching set data 106, to memory 104.

On the other hand, when there is read access from a certain master to address 1, address 2 and address 3, access judgment managing section 105 refers to access judgment result 107 in write access. Then, access judgment managing section 105 does not read data from memory 104 for access to an address at which write data matches set data 106 (represented by "1" in FIG. 3 as described above), makes set data 106 read data and returns the read data to a master having requested read access. In addition, access judgment managing section 105 reads data from memory 104 for access to an address at which write data does not match set data 106 (represented by "0" in FIG. 3 as described above), and returns the read data from memory 104 to the master having requested read access.

Figure 4:
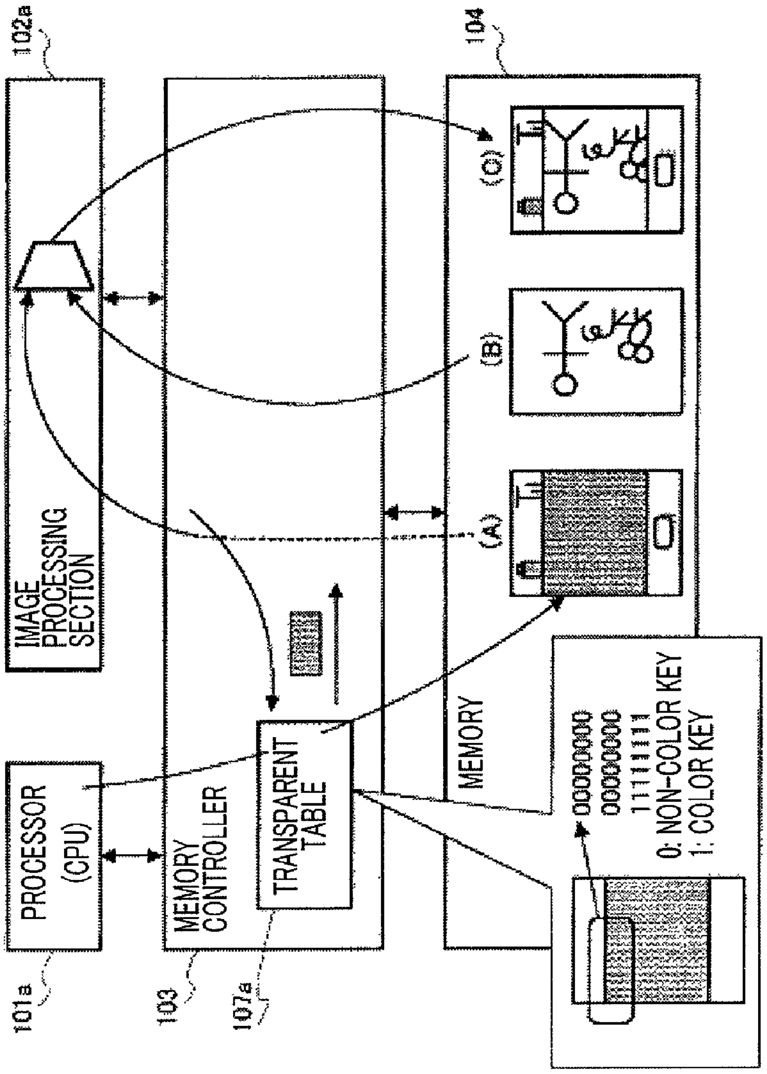
FIG. 4 is a schematic diagram showing an example in which the access judgment managing function shown in FIG. 3 is applied to color key transparency.

FIG. 4 is a schematic diagram showing an example in which the access judgment managing function shown in FIG. 3 is applied to color key transparency.

FIG. 4 shows a case in which image C is created by blending image A and image B stored in memory 104, in the same way as in FIG. 1. Color key data is set for image A. Processor (CPU) 101*a* creates image A, that is, sets color key data for image A. When there is write access for image A from processor (CPU) 101*a*, memory controller 103 (particularly, access judgment managing section 105) judges whether or not write data matches color key data, creates and manages color key (flag) table or transparent table 107*a*. Transparent table 107*a* is equivalent to access judgment result 107 in FIG. 3. For example, transparent table 107*a* is configured by setting non-color key data to "0" and setting color key data to "1" per bit in image A, as shown in the balloon in FIG. 4. At this time, color key data of image A is not written to memory 104.

Meanwhile, when there is read access from image processing section 102*a* to image A, memory controller 103 (particularly, access judgment managing section 105) refers to transparent table 107*a* and detects whether or not pixels of a color key should be read. Then, when detecting that pixels of a color key should be read, memory controller 103 (access judgment managing section 105) does not access memory 104 and returns color key data to image processing section 102*a*. That is, memory controller 103 (access judgment managing section 105) does not read data for a color key.

As described above, according to the present embodiment, whether or not write data satisfies an access judgment condition in write access is judged, this judgment result and access position information (an address on memory 104) in this write access is managed as access judgment result 107, and, when write data satisfies the access judgment condition, write access is not performed. Meanwhile, when read access is performed to that address, the access judgment result (access position information and judgment result) 107 is referred, and, if the access judgment condition is satisfied in write access to that address, read access to memory 104 is not performed, and data that is determined from the access judgment condition is returned to the master. Therefore it is possible to reduce the number of read accesses as well as the number of write accesses, and also it is possible to significantly reduce memory bandwidths.

Here, with the present embodiment, although the number of set data is one, this is by no means limiting. The number of set data may not be one, and a plurality of set data may be possible. Here, in this case, it is necessary to manage which set data is matching, in addition to match/mismatch with set data.

In addition, although a case of color key transparency is used as an application, the present embodiment is not limited to this. With the present embodiment, a specific color (designated color) is meaningful without limiting to a color key, and it may be possible to create a table by detecting a designated color (without limiting to a color key).

In addition, although transparent table 107*a* in FIG. 4 is placed on memory controller 103, the present embodiment is not limited to this. It is possible to place a transparent table on memory 104. In particular, when memory 104 includes a frame buffer, access judgment result 107 may be stored in another field in memory 104 or may be stored in coordinates on the frame buffer in another memory.

In addition, whether or not an access judgment condition is satisfied may be judged in a specific field in memory 104. By this means, it is possible to reduce the size of a management table such as a transparent table. In addition, in a case of, for example, color key transparency, although it is not possible to use one specific color (color key) when color key transparency is performed, it is possible to use the specific color (color key) as a normal color in fields other than a specific field by designating the specific field in memory 104. To be more specific, for example, if the same color as a color key is used in portions other than the gray zone in image A in FIG. 4, color key transparency is performed on the portions (that is, image B appears there) in usual, so that it is not possible to use the same color. However, by designating only the above described gray zone as a specific field, it is possible to use the same color as a color key as a normal color in portions other than the specific field.

Embodiment 2

Embodiment 2 is a case in which a simplified table is created. Here, an information processing apparatus according to the present embodiment has the same basic configuration as that of information processing apparatus 100 corresponding to embodiment 1 shown in FIG. 2, so that the same components will be assigned the same reference numerals and descriptions will be omitted.

Figure 5:
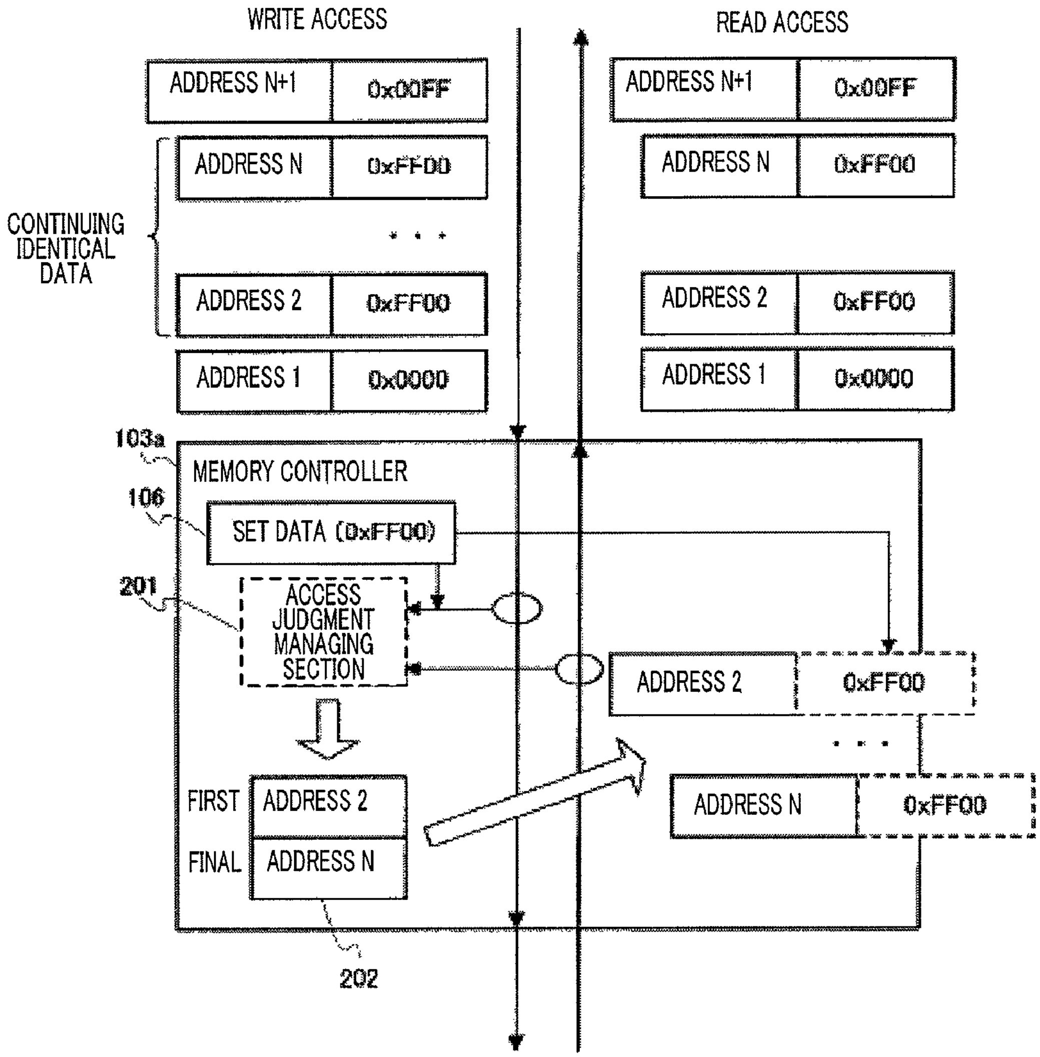
FIG. 5 is a schematic diagram showing an exemplary access judgment managing function according to embodiment 2 of the present invention.

FIG. 5 is a schematic diagram showing an exemplary access judgment managing function according to the present embodiment.

With embodiment 1, since memory controller 103 (or memory 104) has to store the number of bits corresponding to fields to perform access judgment as access judgment result 107 (transparent table 107*a*) in advance, the required memory capacity increases. Therefore, with the present embodiment, for example, access judgment managing section 201 in memory controller 103*a* stores only the first and final addresses of data matching set data 106 as access judgment result 202, as shown in FIG. 5. By this means, it is possible to significantly reduce the memory capacity of memory controller 103 (or memory 104). This configuration is effective for a case in which identical data continue although naturally it is not possible to perform access judging management per access unit.

In addition, a plurality of pairs of first and final addresses may be prepared depending on possible cases. This allows access judging management of a plurality of continuing identical data.

Here, first and final addresses to be stored in advance may be offset values from the reference address, or, when an object to access is image data on a frame buffer, coordinates on the frame buffer may be stored instead of addresses.

Figure 6:
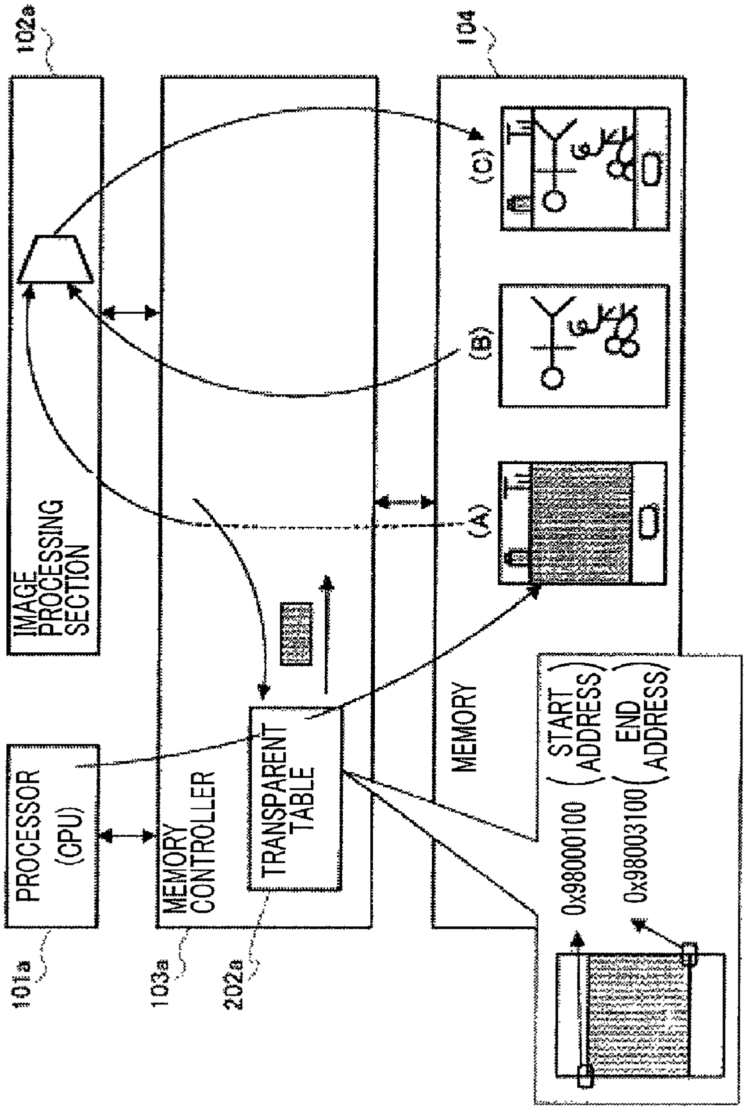
FIG. 6 is a schematic diagram showing an example in which the access judgment managing function shown in FIG. 5 is applied to color key transparency.

FIG. 6 is a schematic diagram showing an example in which the access judgment managing function shown in FIG. 5 is applied to color key transparency.

The example shown in FIG. 6 differs in the configuration of the transparent table from the example shown in FIG. 4. That is, with the example shown in FIG. 6, when there is write access for image A from processor (CPU) 101*a*, memory controller 103*a* (particularly, access judgment managing section 201) judges whether or not write data matches color key data and creates and manages transparent table 202*a*. Transparent table 202*a* is equivalent to access judgment result 202 in FIG. 5. For example, transparent table 202*a* is configured by storing only the first address (start address) and the final address (end address) of data matching set data 106 as shown in the balloon in FIG. 6. Here, it may be possible to store coordinates instead of addresses, or may be possible to store a plurality of pairs of addresses according to need, as described above.

As described above, according to the present embodiment, since only the first and final addresses of data matching set data 106, are stored as access judgment result 202, it is possible to significantly reduce the memory capacity of memory controller 103*a* (or memory 104) in addition to the advantage of embodiment 1.

A case will be described with embodiment 3 where a table is created by detecting continuing identical data. Here, an information processing apparatus according to the present embodiment has the same basic configuration as that of information processing apparatus 100 corresponding to embodiment 1 shown in FIG. 2, so that the same components will be assigned the same reference numerals and descriptions will be omitted.

Figure 7:
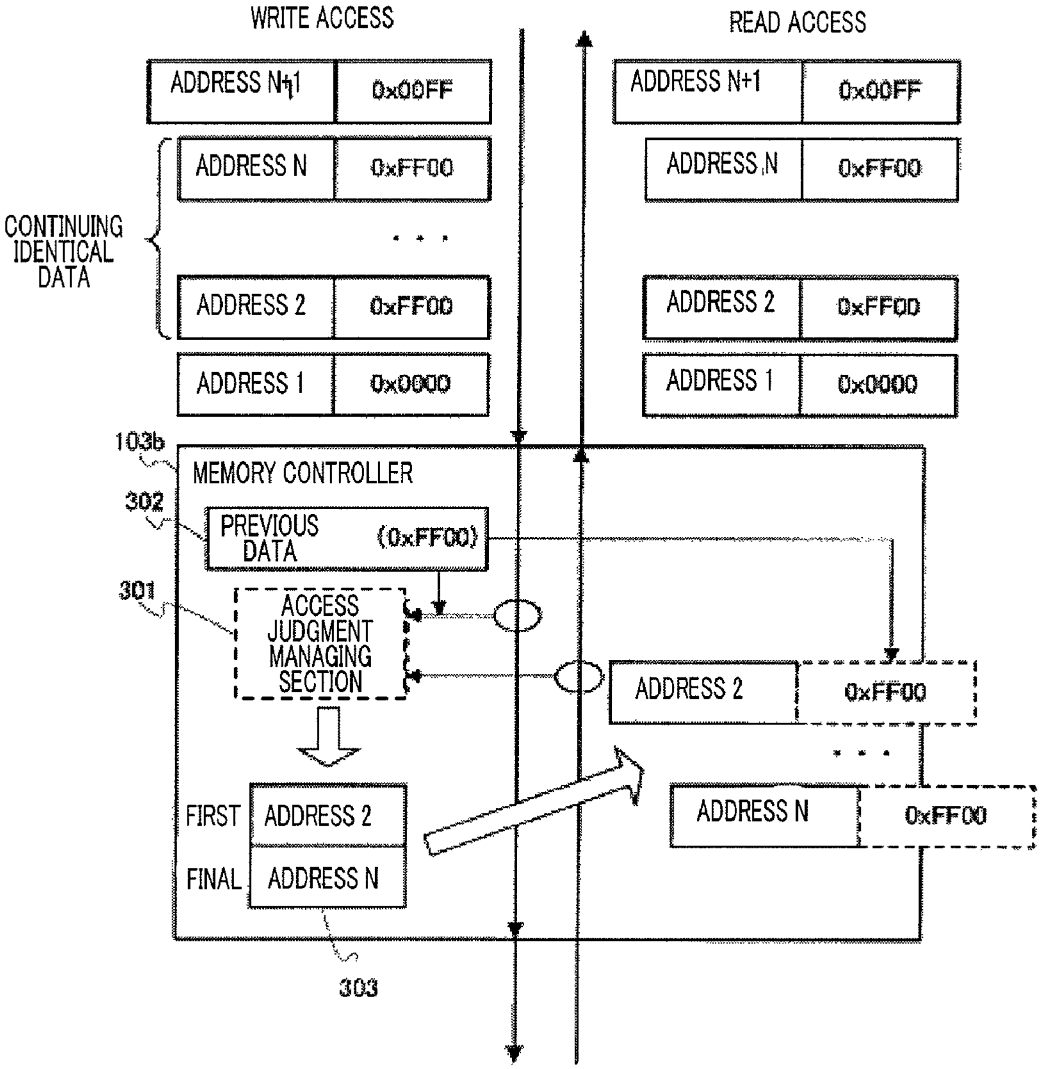
FIG. 7 is a schematic diagram showing an exemplary access judgment managing function according to embodiment 3 of the present invention.

FIG. 7 is a schematic diagram of an exemplary access judgment managing function according to the present embodiment.

With the present embodiment, access judgment managing section 301 in memory controller 103*b* judges, as an access judgment condition, whether or not the current write data matches previous write data 302 by holding the write data 302 in the previous write access performed by a certain master, not whether or not write data matches set data set by one of a plurality of masters (or one specific master), for example, as shown in FIG. 7. Then, access judgment managing section 301 stores the first and final addresses of continuing identical data as access judgment result 303.

As described above, according to the present embodiment, since only the first and final addresses of continuing identical data are stored as access judgment result 303, in addition to the advantage of embodiment 1, it is possible to significantly reduce the memory capacity of memory controller 103*b* (or memory 104).

Here, although whether or not the current write data matches the previous write data, that is, whether or not identical data continue is judged as an access judgment condition by paying attention to write processing by the processor, the present embodiment is not limited to this. For example, as an access judgment condition, it may be possible to judge whether or not current write data matches data on the access position previous to the position this write data is accessed, that is, whether or not identical data continue by paying attention to access positions. By this means, even if a plurality of processors (CPUs) generate (write) images and an image processing section reads these images, it is possible to judge that these images continue regardless in which processor (CPU) generates each image, by paying attention to access positions.

The disclosure of Japanese Patent Application No. 2007-339876, filed on Dec. 28, 2007, including the specification, drawings and abstract, is incorporated herein by reference in its entirety.

INDUSTRIAL APPLICABILITY

The image processing apparatus according to the present invention provides an advantage of allowing a significant reduction in memory bandwidth, and is useful for all digital equipment having a problem with memory bandwidth.

The invention claimed is:

1. An image processing apparatus comprising:

a storing section that stores data;

a first processing section that requests write access to the storing section;

a second processing section that requests read access to the storing section; and an access control section that controls the write access from the first processing section to the storing section and the read access from the second processing section to the storing section individually, wherein:

at a time of the read access from the second processing section to the storing section, the access control section refers the second processing section to the storing section, the access control section refers to a judgment result obtained by judging whether or not write data satisfies a predetermined condition at a time of the write access from the first processing section to the storing section and access position information at the time of the writing access, and, when the judgment result corresponding to an access position at the time of the read access indicates that the write data satisfies the predetermined condition at the time of the write access, returns predetermined data that is determined from the predetermined condition, to the second processing section, without reading data from the storing section, and at the time of the write access from the first processing section to the storing section, the access control section judges whether or not the write data satisfies the predetermined condition, manages the obtained judgment result and the access position information at the time of the write access, and performs no writing of the write data satisfying the predetermined condition to the storing section.

2. The information processing apparatus according to claim 1, wherein, when the judgment result corresponding to the access position at the time of the read access indicates that the write data does not satisfy the predetermined condition at the time of the write access, the access control section reads data from the storing section, and returns the data read from the storing section, to the second processing section.

3. The information processing apparatus according to claim 1, wherein the predetermined condition is whether or not the write data matches preset data.

4. The information processing apparatus according to claim 1, wherein the predetermined condition is whether or not the write data matches previous write data.

5. The information processing apparatus according to claim 1, wherein the predetermined condition is whether or not the write data matches data on previous access position.

6. The information processing apparatus according to claim 1, wherein the access control section judges, in only a specific field in the storing section, whether or not the write data satisfies the predetermined condition.

7. The information processing apparatus according to claim 1, wherein the access position information is an address in the storing section.

8. The information processing apparatus according to claim 1, wherein the access position information is a coordinate in the storing section.

9. The information processing apparatus according to claim 1, wherein the judgment result and the access position information are stored in the access control section or the storing section.

10. The information processing apparatus according to claim 1, wherein the access control section manage the judgment result in a form of a table.

11. The information processing apparatus according to claim 1, wherein when continuing identical write data satisfy the predetermined condition, the access control section manages, as the judgment result, a first address and a final address of the continuing identical write data satisfying the predetermined condition.

12. The information processing apparatus according to claim 1, wherein when continuing identical write data satisfy the predetermined condition, the access control section manages, as the judgment result, a first coordinate and a final coordinate of the continuing identical write data satisfying the predetermined condition.

13. An access control method in an image processing apparatus including: a storing section that stores data; a first processing section that requests write access to the storing section; a second processing section that requests read access to the storing section; and an access control section that controls the write access from the first processing section to the storing section and the read access from the second processing section to the storing section individually, the access control method comprising:

at a time of the read access from the second processing section to the storing section, referring to a judgment result obtained by judging whether or not write data satisfies a predetermined condition at a time of the write access from the first processing section to the storing section and access position information at the time of the write access, and when the judgment result corresponding to an access position at a time of the read access indicates that the write data satisfies the predetermined condition at the time of the write access, returning predetermined data that is determined from the predetermined condition, to the second processing section, without reading data from the storing section; and at the time of the write access from the first processing section to the storing section, judging whether or not the write data satisfies the predetermined condition, managing the obtained judgment result and the access position information at the time of the write access, and performing no writing of the write data satisfying the predetermined condition to the storing section.

* * * * *